United States Patent
Jones et al.

(10) Patent No.: US 10,078,815 B2
(45) Date of Patent: *Sep. 18, 2018

(54) OVERSTOCK INVENTORY SORTING AT RETAIL SALES FACILITIES

(71) Applicant: Wal-Mart Stores, Inc., Bentonville, AR (US)

(72) Inventors: Matthew A. Jones, Bentonville, AR (US); Nicholaus A. Jones, Fayetteville, AR (US); Robert J. Taylor, Rogers, AR (US); Marc A. Fletter, Bentonville, AR (US); Daniel R. Shields, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,165

(22) Filed: Nov. 22, 2017

(65) Prior Publication Data
US 2018/0107974 A1 Apr. 19, 2018

Related U.S. Application Data

(63) Continuation of application No. 15/202,956, filed on Jul. 6, 2016, now Pat. No. 9,852,396.
(Continued)

(51) Int. Cl.
*G06F 19/00* (2018.01)
*G06Q 10/08* (2012.01)
(Continued)

(52) U.S. Cl.
CPC ....... *G06Q 10/087* (2013.01); *G06K 7/10861* (2013.01); *G06K 19/06028* (2013.01); *G06K 19/07758* (2013.01)

(58) Field of Classification Search
CPC ...... G06Q 10/037; G06Q 30/06; G06Q 10/08; G06K 7/10861; G06K 19/06028; G06K 19/07758; G06K 20/20
(Continued)

(56) References Cited

U.S. PATENT DOCUMENTS 6,341,269 B1   1/2002  Dulaney
7,084,769 B2   8/2006  Bauer
(Continued)

FOREIGN PATENT DOCUMENTS

WO   2008039157 A1   4/2008
WO   2012018852 A2   2/2012

OTHER PUBLICATIONS

USPTO; U.S. Appl. No. 15/202,956; Notice of Allowance dated Aug. 23, 2017.
(Continued)

*Primary Examiner* — Karl D Frech
(74) *Attorney, Agent, or Firm* — Fitch, Even, Tabin & Flannery LLP

(57) ABSTRACT

In some embodiments, methods and systems of locating overstock items at a retail sales facility include receiving data when a worker of the retail sales facility scans a product case containing a product using an inventory management electronic device including a processor; obtaining at least one inventory management factor associated with the product; estimating whether the product is to be picked by the worker from a storage bin at a stock room location while packed in the product case or after being removed from the product case; and outputting, based on the estimating step, an indication to the worker either that the product is to be picked from the storage bin without being removed from the product case, or that the product is to be picked from the storage bin after being removed from the product case.

17 Claims, 10 Drawing Sheets

Related U.S. Application Data

(60) Provisional application No. 62/200,518, filed on Aug. 3, 2015.

(51) Int. Cl.
*G06K 19/06* (2006.01)
*G06K 7/10* (2006.01)
*G06K 19/077* (2006.01)

(58) Field of Classification Search
USPC .................................................. 235/385, 383
See application file for complete search history.

(56) References Cited

U.S. PATENT DOCUMENTS

| | | |
|---|---|---|
| 7,240,027 B2 | 7/2007 | McConnell |
| 9,852,396 B2 * | 12/2017 | Jones ................... G06Q 10/087 |
| 2005/0075949 A1 | 4/2005 | Uhrig |
| 2007/0016494 A1 | 1/2007 | Brown |
| 2007/0027745 A1 | 2/2007 | Ouimet |
| 2007/0061210 A1 | 3/2007 | Chen |
| 2015/0052019 A1 | 2/2015 | Field-Darraugh |
| 2016/0055357 A1 | 2/2016 | Hicks |

OTHER PUBLICATIONS

USPTO; U.S. Appl. No. 15/202,956; Office Action dated Apr. 20, 2017.

* cited by examiner

OVERSTOCK INVENTORY SORTING AT RETAIL SALES FACILITIES

CROSS-REFERENCE TO RELATED APPLICATION

This application is a continuation of U.S. application Ser. No. 15/202,956, filed Jul. 6, 2016, which claims the benefit of U.S. Provisional Application No. 62/200,518, filed Aug. 3, 2015, which are incorporated herein by reference in their entireties.

TECHNICAL FIELD

This invention relates generally to managing inventory at retail sales facilities and, in particular, to systems and methods for sorting overstock items at retail sales facilities.

BACKGROUND

Retail sales facilities typically stock items at "case" or pack levels instead of "each" or individual item levels for efficiency of inventory management. In some cases, it is more efficient to open the cases of certain products and manage such product inventory at the "each" level (i.e., individual units). For example, if a storage bin or another location in a stock room of the retail sales facility contains multiple stock keeping units (SKUs) or a large number of different items, the inventory often becomes difficult to manage by way of case level.

Conventional inventory management systems typically do not distinguish between situations when it is more advantageous to manage the product at the case level or at the each level. As such, the stocking associates have to either use their judgment or rely on their manager to decide whether an item is to be stocked and managed as a case item or as an each item. This may lead to undesired user error and/or inconsistencies in the way certain inventory items are stocked at various retail sales facilities. In addition, managing items at an each level when it is more advantageous to manage the item at a case level may unnecessarily take up a large portion of time from department managers and/or sales associates at the retail sales facility. Conversely, managing items at a case level when it is more advantageous to manage the item at an each level may lead to inefficiency in stocking and retrieving such items from the stock room.

BRIEF DESCRIPTION OF THE DRAWINGS

Disclosed herein are embodiments of systems, apparatuses and methods pertaining to methods and systems for sorting overstock inventory. This description includes drawings, wherein.

Figure 1:
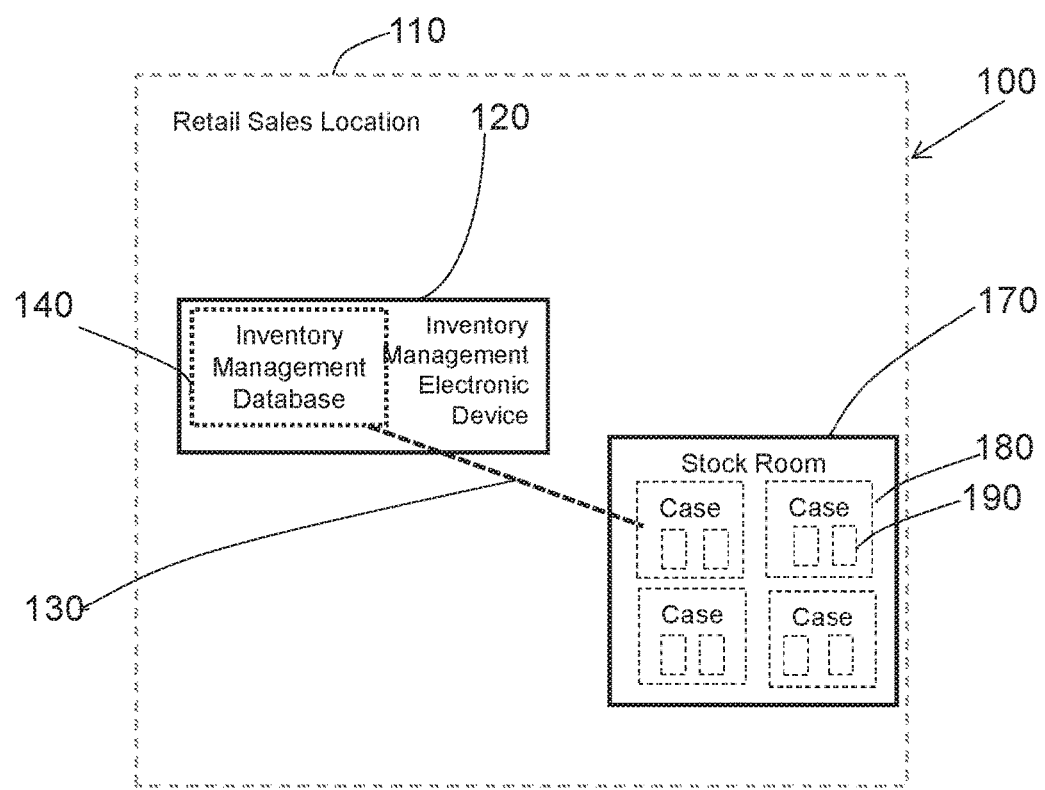
FIG. 1 is a diagram of a retail sales facility overstock sorting system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, this application describes systems and methods of sorting overstock items at a retail sales facility. In some embodiments, the systems and methods as described herein include one or more electronic devices configured to receive data when a worker of the retail sales facility scans a product case containing a product using an inventory management electronic device and estimate whether the product is to be picked by the worker from a storage bin at a stock room location while packed in the product case (i.e. case level) or after being removed from the product case (each level).

In one embodiment, a method of sorting overstock items at a retail sales facility includes: receiving data, via a worker of the retail sales facility scanning a product case containing at least one product using an inventory management electronic device including a processor; obtaining, using the inventory management electronic device, at least one inventory management factor associated with the at least one product; estimating, based on the at least one inventory management factor associated with the at least one product, whether the at least one product is to be picked by the worker from a storage bin at a stock room location of the retail sales facility while packed in the product case or after being removed from the product case; outputting, when the estimating step supports picking the at least one product from the storage bin while packed in the product case, an indication to the worker that the at least one product is to be picked from the storage bin without being removed from the product case; and outputting, when the estimating step supports picking the at least one product from the storage bin after being removed from the product case, an indication to the worker that the at least one product is to be picked from the storage bin after being removed from the product case.

In an embodiment, a system for sorting overstock items at a retail sales facility includes at least one inventory management database including information regarding at least one product at the retail sales facility and an inventory management electronic device including a control circuit having a processor in communication with the database. The inventory management electronic device is configured to: receive data, via a worker of the retail sales facility scanning a product case containing at least one product using the inventory management electronic device; obtain at least one inventory management factor associated with the at least one product; estimate, based on the obtained at least one inventory management factor associated with the at least one product, whether the at least one product is to be picked by the worker from a storage bin at a stock room location of the retail sales facility while packed in the product case or after being removed from the product case; output, when the estimate supports picking the at least one product from the storage bin while packed in the product case, an indication to the worker that the at least one product is to be picked from the storage bin without being removed from the product case; and output, when the estimate supports picking the at least one product from the storage bin after being removed from the product case, an indication to the worker that the at least one product is to be picked from the storage bin after being removed from product case.

In one embodiment, a system for sorting overstock items at a retail sales facility includes at least one storage means including information regarding at least one product at the retail sales facility and at least one control means in communication with the database and configured to: receive data, via a worker of the retail sales facility scanning a product case containing at least one product using the inventory management electronic device; obtain at least one inventory management factor associated with the at least one product; estimate, based on the obtained at least one inventory management factor associated with the at least one product, whether the at least one product is to be picked by the worker from a storage bin at a stock room location of the retail sales facility while packed in the product case or after being removed from the product case; output, when the estimate supports picking the at least one product from the storage bin while packed in the product case, an indication to the worker that the at least one product is to be picked from the storage bin without being removed from the product case; and output, when the estimate supports picking the at least one product from the storage bin after being removed from the product case, an indication to the worker that the at least one product is to be picked from the storage bin after being removed from product case.

Referring to FIG. 1, one embodiment of a system 100 for sorting out of stock products at a retail sales facility 110 is shown. The retail sales facility 110 may be any place of business such as a store or warehouse where consumer products are stocked and/or sold. The system 100 includes an inventory management electronic device 120 configured to manage product inventory at the retail sales facility 110. The inventory management electronic device 120 illustrated in FIG. 1 may be a stationary, portable, or hand-held electronic device, for example, a desktop computer, a laptop computer, a tablet, a mobile phone, or any other device that may be configured for data entry and communication with another device located at the retail sales facility 110, or at a location remote to the retail sales facility 110 (e.g., a regional or central server configured for two-way communication with multiple retail sales facilities 110).

The inventory management electronic device 120 shown in FIG. 1 includes an inventory management database 140 configured to store information regarding the cases 180 containing one or more individual items 190 and the unpacked individual items 190 present at the retail sales facility 110. The inventory management database 140 may be stored, for example, on non-volatile storage media (e.g., a hard drive, flash drive, or removable optical disk) internal or external relative to the inventory management electronic device 120 or internal to computing devices (e.g., remote server) separate and distinct from the inventory management electronic device 120. The information regarding the cases 180 and/or items 190 may include various historical/statistical inventory management factors pertaining to the retail sales facility in general and/or to past actual consumer demand for (i.e., sales of) the items 190 at the retail sales facility 110. As discussed in more detail below, the inventory management factors enable the system 100 determine whether to manage the items 190 at the retail sales facility at the case (i.e., pack) level or the each (i.e., individual level).

In some embodiments, the inventory management electronic device 120 may obtain identifying indicia of a case 180 of items 190 (e.g., label, tag, a barcode, radio frequency identification (RFID), or the like) when a user (e.g., stock room associate) scans the case 180 by communicating via a communication pathway 130 (e.g., radio waves) with the barcode or RFID of the case 180. In some embodiments, the inventory management electronic device 120 may obtain identifying indicia of the case 180 such as the SKU number or another identifier when the user manually enters the SKU or another number identifying the case 180 into the inventory management electronic device 120. In some embodiments, the inventory management electronic device 120 may be used by a stocking (or another) associate at the retail sales location to search for the items 190 directly (e.g., by entering a number, name or other indicia identifying the items 190) instead of directly scanning the case 180, or otherwise manually entering information uniquely identifying the case 180, using the inventory management electronic device 120.

FIG. 1 schematically shows (via the dotted lines 130) that the inventory management database 140 of the inventory management electronic device 120 may receive the data identifying the case 180 that is acquired, for example, when the case 180 is scanned in the stock room 170 by a stocking associate using the inventory management electronic device 120. It will be appreciated that the inventory management database 140 may contain information regarding the overstock cases 180 located outside of the stock room 170 (e.g., on the sales floor, product loading/unloading area, and/or stocking cart). In some embodiments, the cases 180 and/or the items 190 may be identified in the inventory management database 140 by way of stock keeping unit (SKU) numbers or other unique identifiers. It will be appreciated that the inventory management database 140 does not have to be incorporated into the inventory management electronic device 120 at the retail sales facility 110, but may be stored on a remote (e.g., central) server in communication with the inventory management electronic device 120.

Figure 2:
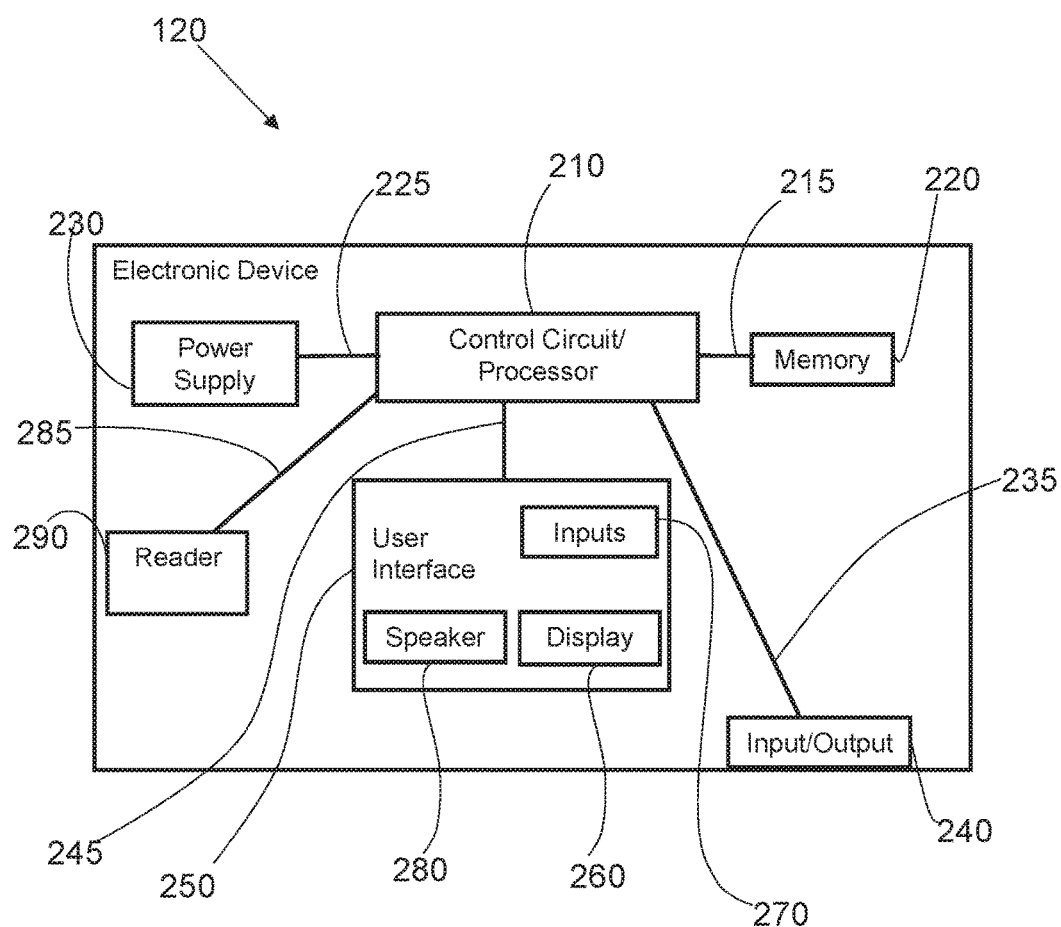
FIG. 2 is a functional diagram of an inventory management electronic device in accordance with several embodiments.

An exemplary inventory management electronic device 120 depicted in FIG. 2 is a computer-based device and includes a control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

This control circuit 210 can be configured (for example, by using corresponding programming stored in the memory 220 as will be well understood by those skilled in the art) to carry out one or more of the steps, actions, and/or functions described herein. In some embodiments, the memory 220 may be integral to the control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)).) The control circuit 210 of the inventory management electronic device 120 is also electrically coupled via a connection 235 to an input/output 240 that can receive signals from and send signals (via a wired or wireless connection) to (e.g., commands, inventory database information), for example, devices local to the retail sales facility 110, or one or more servers remote to the retail sales facility 110.

The control circuit 210 may also be electrically coupled via a connection 285 to a sensor such as a reader 290 configured to detect and/or read information on an identifying label or indicator (e.g., barcode or RFID) located on the case 180 containing the items 190 or on the individual items 190 when the inventory management electronic device 120 is placed in direct proximity to the case 180 or the retail item 190. The reader 290 or the inventory management electronic device 120 may be a radio frequency identification (RFID) reader, an optical reader, a barcode reader, or the like. It will be appreciated that the reader 290 may be incorporated into a physical structure of the inventory management electronic device 120 or may be a stand-alone device in communication with the inventory management electronic device 120.

In the embodiment shown in FIG. 2, the control circuit 210 of the electronic device 120 is electrically coupled via a connection 245 to a user interface 250, which may include a visual display or display screen 260 (e.g., LED screen) and/or button input 270 that provide the user interface 250 with the ability to permit a user such as a stock room or sales floor associate at the retail sales facility 110 to manually control the inventory management electronic device 120 by inputting commands, for example, via touch-screen and/or button operation or voice commands. The display screen 260 can also permit the user to see various menus, options, and/or alerts displayed by the inventory management electronic device 120. The user interface 250 of the inventory management electronic device 120 may also include a speaker 280 that may provide audible feedback (e.g., alerts) to the user.

Figure 3:
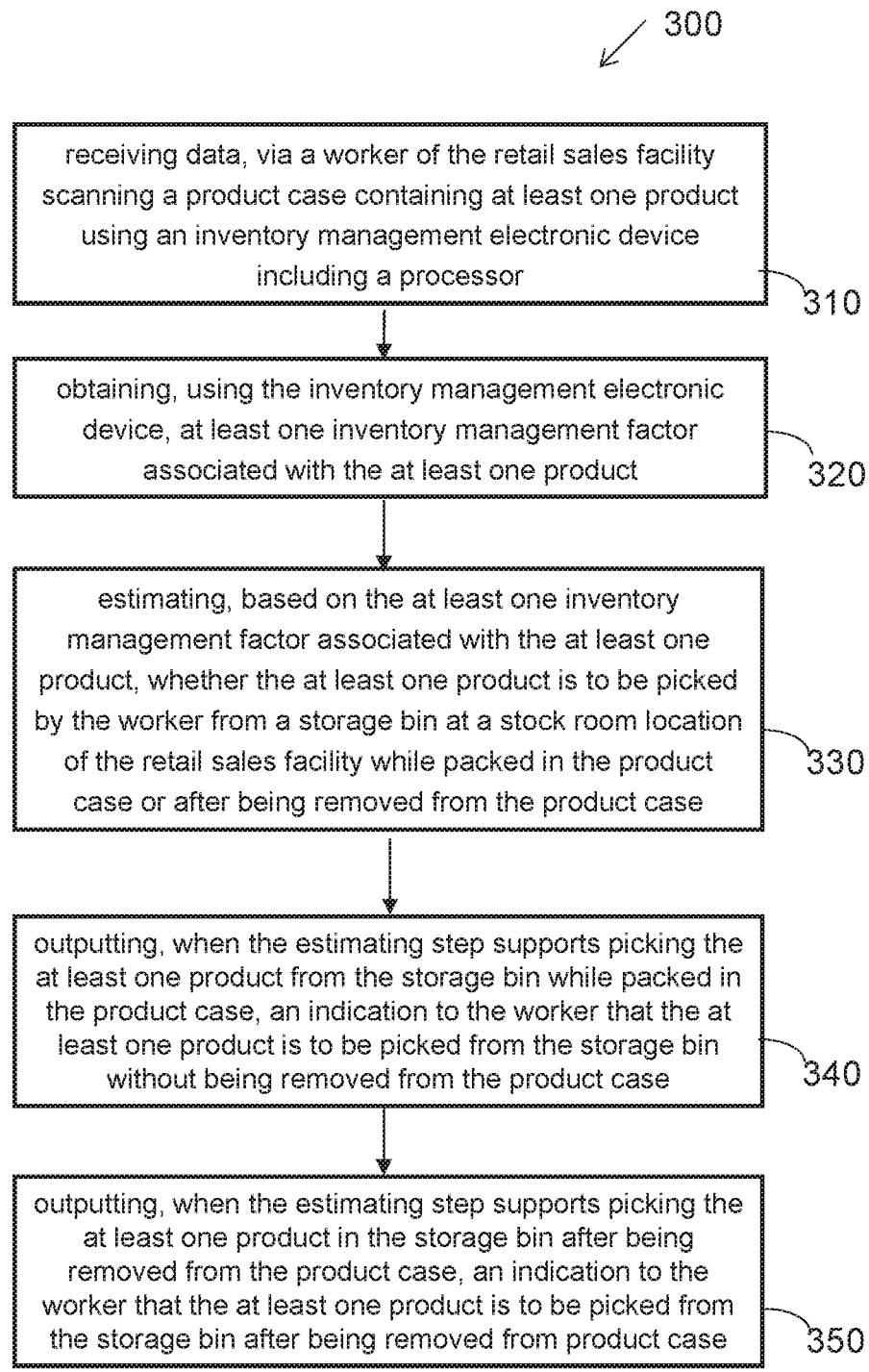
FIG. 3 is a flow chart diagram of a process of sorting overstock items at a retail sales location in accordance with some embodiments.

With reference to FIGS. 1-3, one method 300 of operation of the system 100 to manage and sort cases 180 and/or individual products 190 at a retail sales facility 110 will now be described. For exemplary purposes, the method is described in the context of the system of FIG. 1, but it is understood that embodiments of the method may be implemented in this or other systems. Generally, as shown in FIG. 3, the method 300 includes receiving, receiving data, via a worker of the retail sales facility 110 scanning a product case 180 containing one or more items 190 using the inventory management electronic device 120 (step 310). As discussed above, such data may be obtained when the worker scans the barcode, RFID, or the like of a case 180 containing the items 190 in the stock room 170 (or another location at the retail sales facility 110 when overstock cases 180 and/or items 190 may be temporarily stored) using the inventory management electronic device 120. Such data, when received by the inventory management electronic device 120, identifies the items 190 contained in the case 180.

In the embodiment shown in FIG. 3, the method 300 further includes obtaining, using the inventory management electronic device 120, one or more inventory management factors associated with the items 190 contained in the scanned case 180. In some embodiments, in response to the stocking associate at the retail sales facility 110 scanning a case 180 containing overstock items 190 using the inventory management electronic device 120, the processor of the control circuit 210 of the inventory management electronic device 120 may be programmed to send an appropriate query or signal to the inventory management database 140 internal to the inventory management electronic device 120, or via the input/output 240 to a remote inventory management database located at a server remote to the retail sales facility 110.

In some embodiments, upon receiving such a query or signal including data identifying the case 180 and/or the items 190 contained in the case 180, the inventory management database 140 of the inventory management electronic device 120 obtains one or more inventory management factors associated with the item 190 (step 320). Based on one or more of these inventory management factors associated with the item 190, the processor of the control circuit 210 of the inventory management electronic device 120 may determine whether the items 190 in the case 180 are to be managed on a case level or an item level. In other words, the processor of the control circuit 210 of the inventory management electronic device 120 may be programmed to estimate, based on analyzing one or more inventory management factors associated with the product 190, whether the product 190 is to be binned by the worker in a storage bin at the stock room 170 of the retail sales facility 110 as a case level pick item which is designated for management at case level and for storage in the storage bin while packed in the product case 180, or as an each level pick item designated for management at each level and for storage in the storage bin after being removed from the product case 180 (step 330).

In some embodiments, the inventory management factors that may be analyzed by the processor of the control circuit 210 to estimate whether the product 190 is better suited for stocking as a case item or an each item include, but are not limited to: a total number of the product 190 packed in the product case 180 (i.e., case pack); a maximum number of the product 190 for which shelf space is available on a sales floor of the retail sales facility 110 (i.e., shelf capacity); sales velocity of the product 190 at the retail sales facility 110 (i.e., how fast or slow the product sells at the retail sales facility 110); size of the product 190 (i.e., physical dimensions of the product 190); and a total number of the product 190 on hand at the retail sales facility 110.

It will be appreciated that these inventory management factors are listed by way of example only, and that the processor of the control circuit 210 of the inventory management electronic device 120 may be programmed to analyze any combination of one or more of these inventory management factors (or additional inventory management factors) to determine whether the item 190 is to be managed on a case level or an each level when stored in the stockroom 170 of the retail sales facility 110. The relationships between these exemplary inventory management factors is discussed in more detail below with reference to FIGS. 4-10.

Figure 4:
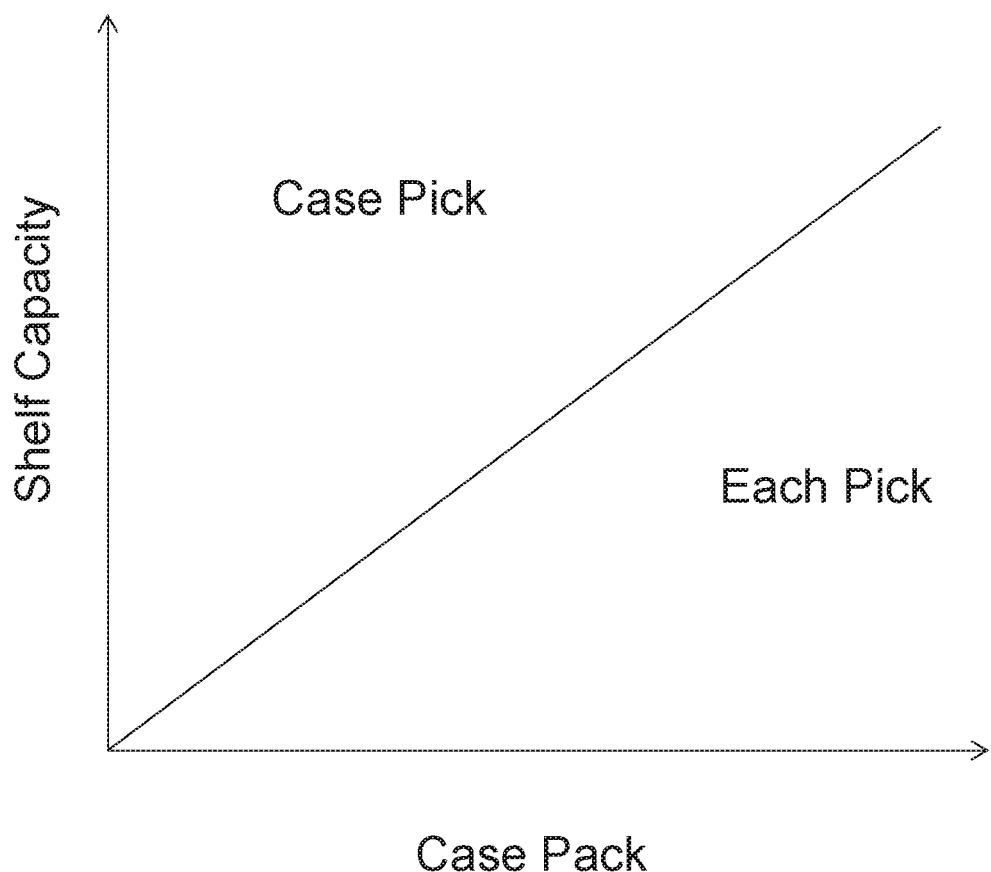
FIG. 4 is a graph diagram showing a relationship between shelf capacity and case pack in connection with determining whether to case pick or each pick an item.

FIG. 4 shows a relationship between shelf capacity (y-axis) and case pack (x-axis), which the processor of the control circuit 210 of the inventory management electronic device 120 may be programmed to analyze in connection with determining whether to stock the item 190 as case pick item or an each pick item. The line in FIG. 4 has a slope of 1:1 and defines whether the item 190 is better suited for case pick or each pick. In other words, a determination (e.g., by the processor of the control circuit 210 of the inventory management electronic device 120 or by another processor-based computing device in communication with the inventory management electronic device 120) that the shelf capacity for the item 190 and/or the case pack of the item 190 is above the line in FIG. 4 supports an estimation that the item 190 is to be managed on a case level (i.e., without being unpacked or removed from the case 180). Conversely, a determination by the processor of the control circuit 210 of the inventory management electronic device 120 or by another processor-based computing device in communication with the inventory management electronic device 120 that the shelf capacity for the item 190 and/or the case pack of the item 190 is below the line in FIG. 4 supports an estimation that the item 190 is to be managed on an each level (i.e., after being unpacked or removed from the case 180).

Figure 5:
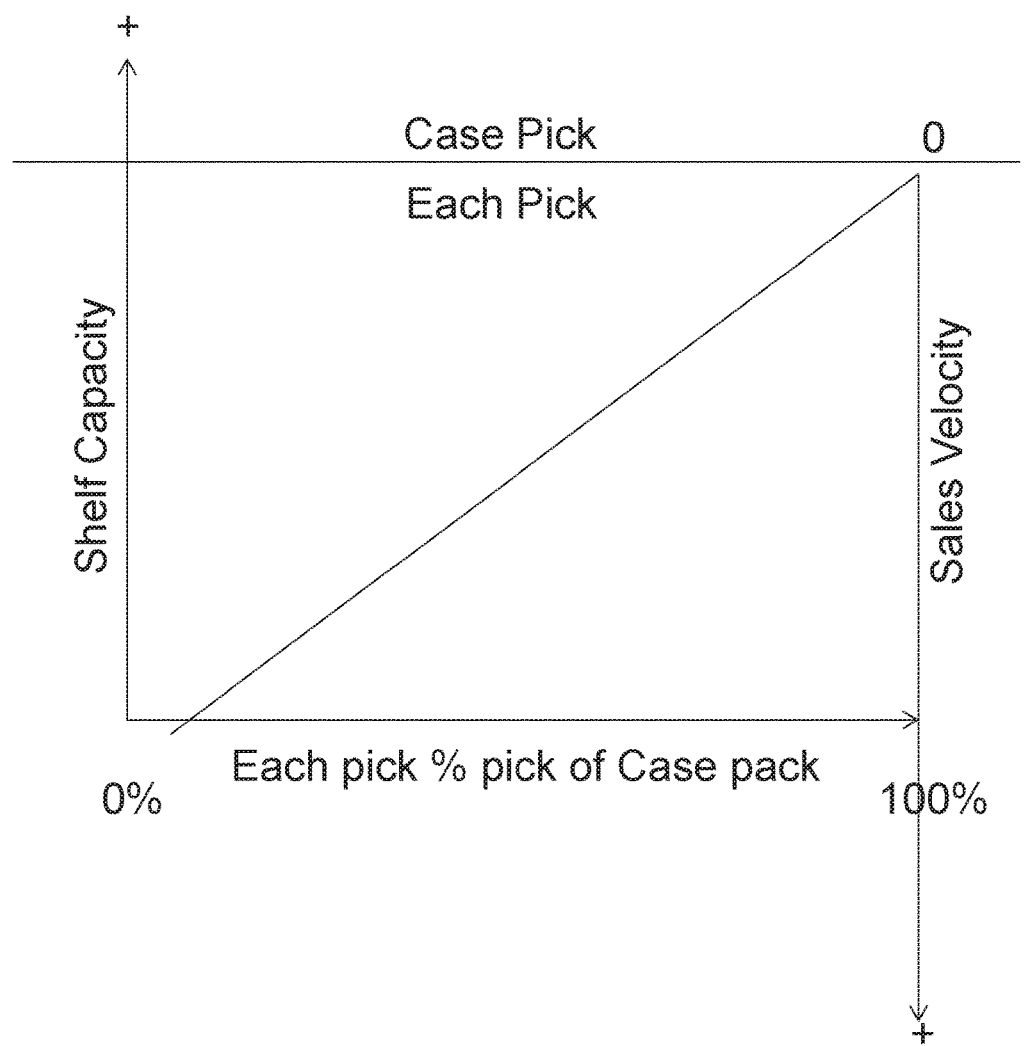
FIG. 5 is a graph diagram showing a relationship between shelf capacity and case pack while taking into account sales velocity in connection with determining whether to case pick or each pick an item.

FIG. 5 shows a relationship between shelf capacity (y-axis) for the item 190 and case pack (x-axis) of the item 190 while taking into account the sales velocity (inverted y-axis) of the item 190 at the retail sales facility 110 in connection with determining (e.g., by the processor of the control circuit 210 of the inventory management electronic device 120) whether to case pick or each pick an item. For overstock items 190 that are each pick items, it is generally inefficient to pick single units of the item 190 for every item 190 sold (i.e., sell one pick one) at the retail sales facility 110. As such, may be more efficient to pick a percentage of the number of items 190 packed in the case 180, or set a predetermined threshold for a number of items 190 that have to be sold.

FIG. 5 shows that as the shelf capacity for an item 190 increases, a higher percentage of the items 190 in the case 180 is estimated by the processor of the control circuit 210 of the inventory management electronic device 120 to be picked to ensure the maximum availability of the items 190 on the shelves of sales floor of the retail sales facility 110. FIG. 5 also shows that as the sales velocity of the item 190 at the retail sales facility 110 increases, a higher percentage of the items 190 in the case 180 is estimated to be picked to ensure the maximum availability of the item 190 on the sales floor of the retail sales facility 110.

Figure 6:
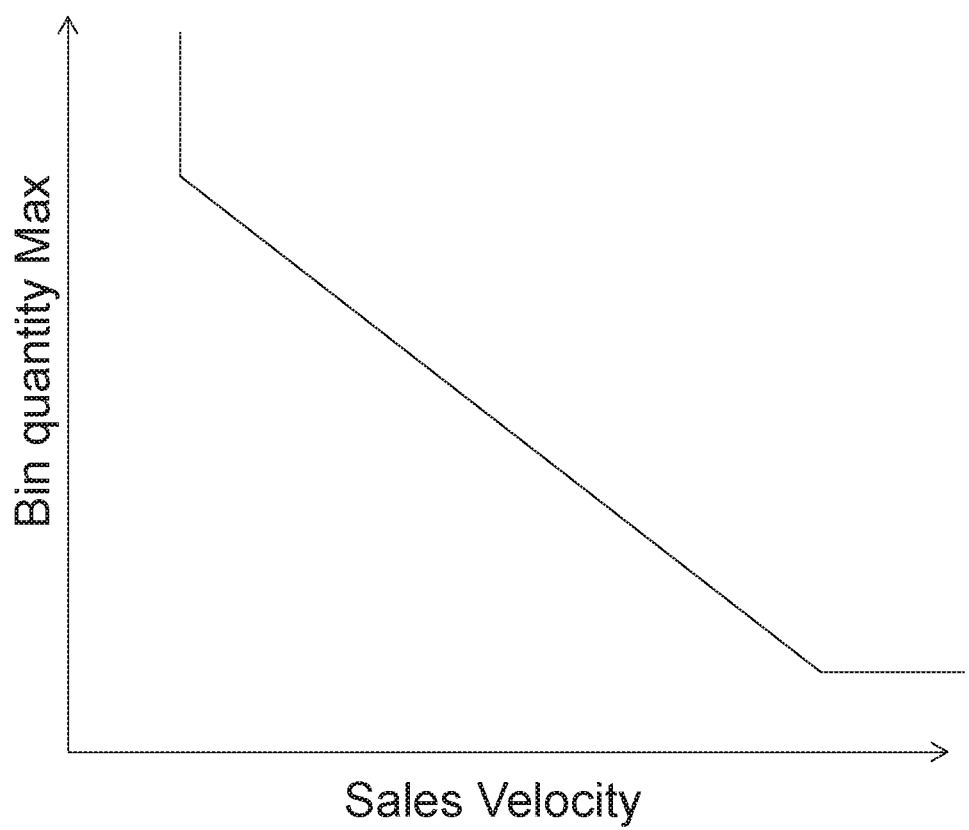
FIG. 6 is a graph diagram showing a relationship between maximum bin quantity and sales velocity in connection with determining whether to case pick or each pick an item.

FIG. 6 shows the relationship between maximum bin quantity (i.e., total number of unique SKUs that may be allowed in one storage bin in the stock room 170) and sales velocity (i.e., how fast an item 190 sells at the retail sales facility 110) in connection with the processor of the control circuit 210 of the inventory management electronic device 120 determining whether to case pick the item 190 or each pick the item 190. FIG. 6 indicates that the items 190 that are considered as slow-selling items (e.g., item 190 that does not sell at least 30% of its shelf cap) can have more SKUs allowed per storage bin with a threshold or limit determined based on how slow the items 190 sell.

For example, an item 190 that never sells at the retail sales facility 110 could have an infinite bin quantity maximum up to the physical threshold of the storage bin (i.e., up to a maximum number of items 190 that may fit into the storage bin based on the physical dimensions of the storage bin). On the other hand, the items 190 that are fast-selling (e.g., item 190 that sells 30% or more of its shelf cap) at the retail sales facility 110 can be limited in the number of SKUs allowed in the storage bin to facilitate the ease of stocking of the items 190 that are of high interest to the consumers at the retail sales facility 110. It will be appreciated that while FIG. 6 represents the relationship between maximum bin quantity and sales velocity for each pick items, the relationship between the maximum bin quantity and sales velocity may be useful for analysis of case pick items, and that the slope of the line used for case pick items would be different than that shown in FIG. 6.

Figure 7:
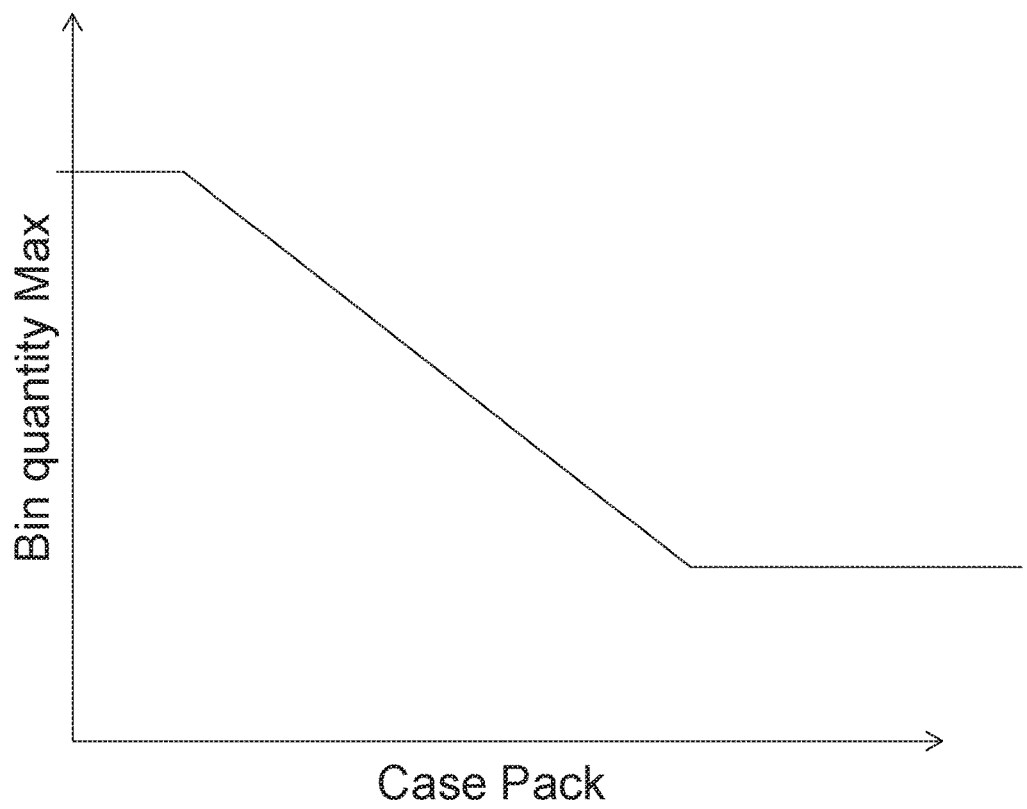
FIG. 7 is a graph diagram showing a relationship between maximum bin quantity and case pack size in connection with determining whether to case pick or each pick an item.

FIG. 7 shows a relationship between maximum bin quantity (described above) and case pack size (i.e., how many items 190 are contained in the case 180) in connection with determining (e.g., by the processor of the control circuit 210 of the inventory management electronic device 120) whether to case pick or each pick the item 190. In FIG. 7, the items 190 with small case packs 180 (e.g., up to four items 190 per case 180) allow for more items 190 to be placed in the storage bin to a limit derived by the number of manageable SKUs in the storage bin and the quantity of those SKUs. Conversely, items 190 with large case packs 180 (e.g., 12 or more items 190 per case 180) reduce the number of allowable unique SKUs in the storage bin both due to physical limits of the storage bin and for efficient picking, binning, and auditing of the items 190. It will be appreciated that while FIG. 7 represents the relationship between maximum bin quantity and case pack size for each pick items, the relationship between the maximum bin quantity and the case pack size may be useful for analysis of case pick items, and that the slope of the line used for case pick items would be different than that shown in FIG. 7.

Figure 8:
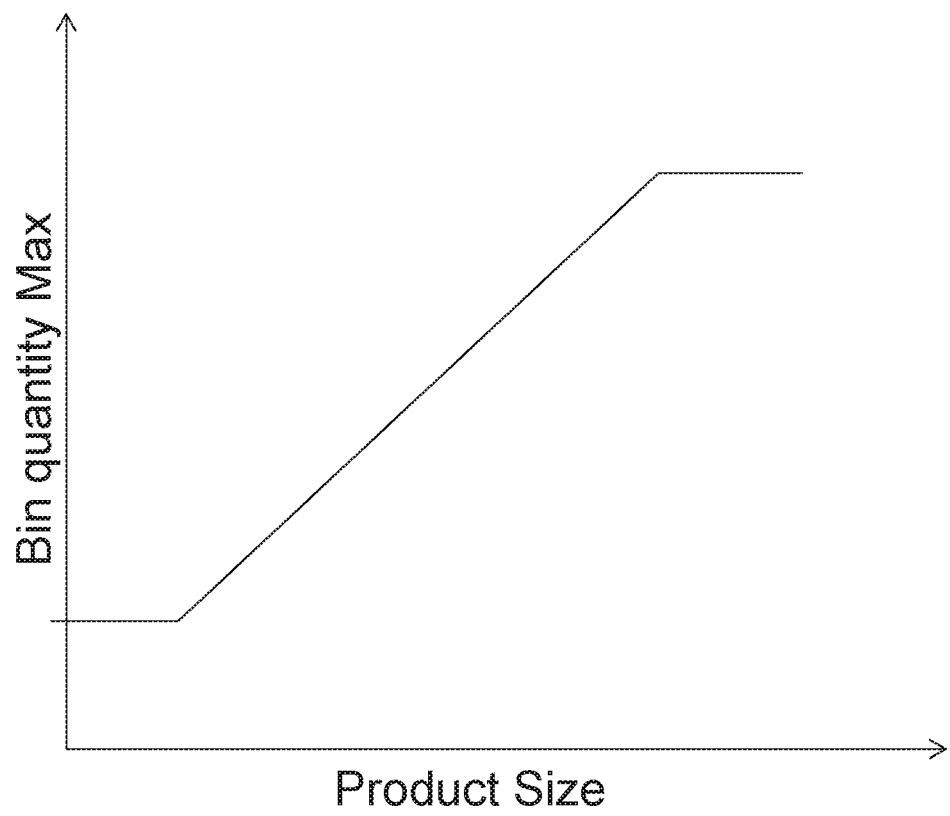
FIG. 8 is a graph diagram showing a relationship between maximum bin quantity and product size in connection with determining whether to case pick or each pick an item.

FIG. 8 shows the relationship between maximum bin quantity (described above) and product size in connection with determining (e.g., by the processor of the control circuit 210 of the inventory management electronic device 120) whether to case pick or each pick an item 190. As shown in FIG. 8, the items 190 that are physically small (and fit in larger numbers in a storage bin) (e.g., items 190 sized up to 6×6×6 inches or items 190 that do not take up more than 15% of the volume of the storage bin) require a reduction of unique SKUs to be able to manage the accuracy of the inventory in the storage bin effectively. Conversely, items 190 that are large in size (e.g., items 190 sized over 6×6×6 inches or items 190 that take up more than 15% of the volume of the storage bin) will physically limit the number of allowable SKUs in a storage bin, but the larger-sized items are easier to manage and therefore more unique SKUs are allowed per storage bin. It will be appreciated that while FIG. 8 represents the relationship between maximum bin quantity and product size for each pick items, the relationship between the maximum bin quantity and the product size may be useful for analysis of case pick items, and that the slope of the line used for case pick items would be different than that shown in FIG. 8.

Figure 9:
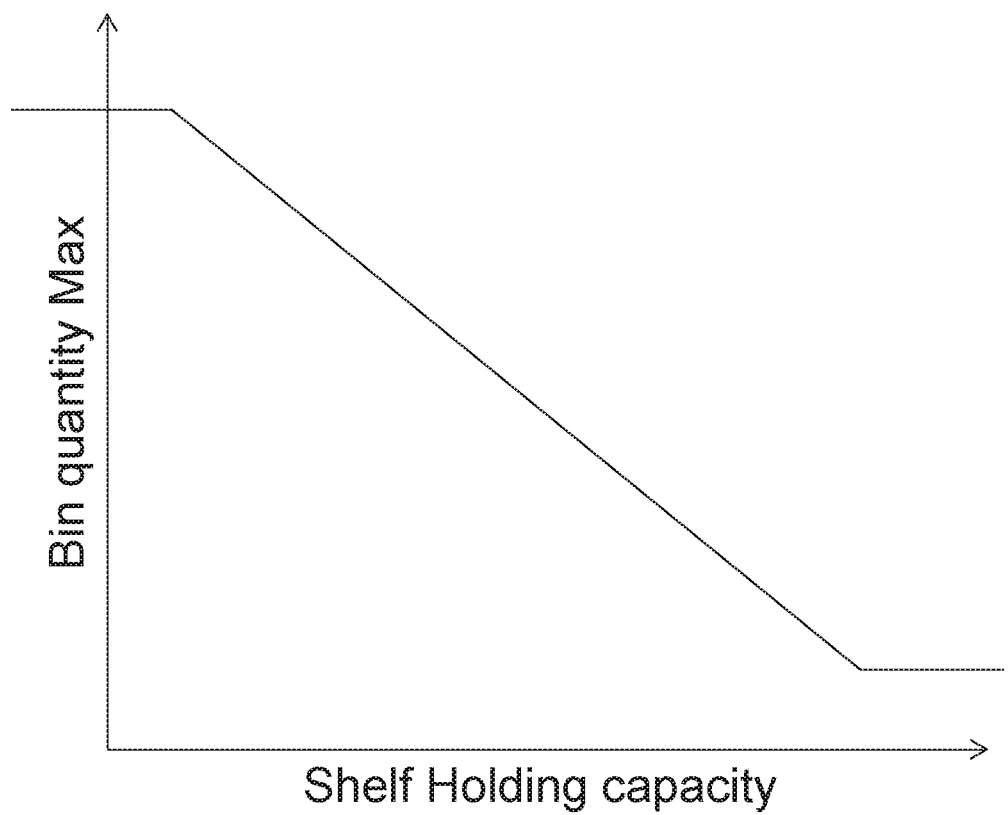
FIG. 9 is a graph diagram showing a relationship between maximum bin quantity and shelf holding capacity in connection with determining whether to case pick or each pick an item.

FIG. 9 depicts a relationship between maximum bin quantity and shelf holding capacity in connection with determining (e.g., by the processor of the control circuit 210 of the inventory management electronic device 120) whether to case pick or each pick an item 190. As can be seen in FIG. 9, the items 190 that take up the shelf holding capacity when present in smaller numbers (i.e., have larger physical size) will be allowed in greater numbers in the storage bins because the probability of such items 190 being eaches and the quantity of those eaches will be small. Conversely, the items 190 that take up the shelf holding capacity when present in larger numbers will be limited in SKU quantity in the storage bin because such items 190 are more likely to be eaches in greater numbers and will be more difficult to manage if a large number of SKUs is present in the storage bin. It will be appreciated that while FIG. 9 represents the relationship between maximum bin quantity and product shelf capacity for each pick items, the relationship between the maximum bin quantity and the product shelf capacity may be useful for analysis of case pick items, and that the slope of the line used for case pick items would be different than that shown in FIG. 9.

Figure 10:
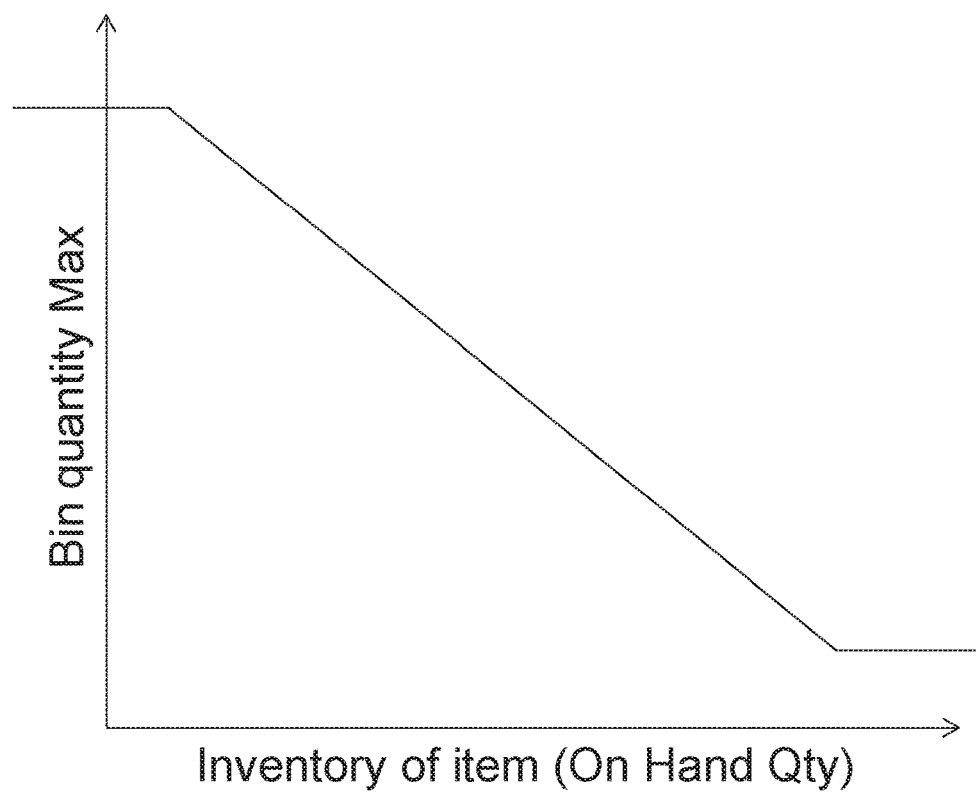
FIG. 10 is a graph diagram showing a relationship between maximum bin quantity and on hand product quantity in connection with determining whether to case pick or each pick an item.

FIG. 10 shows a relationship between maximum bin quantity and on-hand product quantity in connection with determining (e.g., by the processor of the control circuit 210 of the inventory management electronic device 120) whether to case pick or each pick an item 190. As can be seen in FIG. 10, items 190 that are present on-hand in greater numbers at the retail sales facility 110 are more productively managed if the items 190 are in one location (i.e., one storage bin or one area of the stock room 170. Conversely, items 190 that are present on-hand in smaller numbers at the retail sales facility 110 may be effectively managed even if stored in multiple locations (i.e., multiple storage bins or areas of the stock room 170). It will be appreciated that while FIG. 10 represents the relationship between maximum bin quantity and on-hand-inventory for each pick items, the relationship between the maximum bin quantity and the product size may be useful for analysis of case pick items, and that the slope of the line used for case pick items would be different than that shown in FIG. 10.

As can be seen above in the discussion relating to FIGS. 4-10, in order to ensure that eaches of the items 190 in inventory at the retail sales facility 110 are managed efficiently, the processor of the control unit 210 of the inventory management electronic device 120 may be programmed to analyze the sales velocity, presentation (shelf holding capacity), current inventory, and size of the items 190 to determine when to systematically allow binning or picking of the items 190 and when to systematically stock the items 190 in storage bins while keeping the items 190 in the case pack 180, or as eaches removed from the case pack 180.

It will be appreciated that while the exemplary equations graphically depicted in FIGS. 4-10 are linear, exponential modeling could be used to account for variable patterns. In some embodiments, as described above with reference to FIGS. 4-10, items 190 having a large case pack, that sell rapidly, that are small in size, and that have a large shelf holding capacity are restricted to one unique SKU per storage bin and are picked from the storage bin at a variable percentage of the case 180. In other embodiments, items 190 having a small case pack, that sell slowly, that are large in size, and that have a small shelf holding capacity are allowed to be stored in storage bins where multiple SKUs are present and are picked at an each level.

Notably, items 190 at the retail sales location 110 may be picked from the storage bins in cases whenever possible for efficiency (i.e., picking the items 190 in a case 180 puts more items 190 on the shelf of the sales floor of the retail sales facility 110 in one trip by the stocking associate than when the stocking associate carries one item at a time from the stock room 170 to the sales floor). Since some items 190 may be more efficiently managed and stored in storage bins of the stock room 170 of the retail sales facility 110 as eaches (i.e., after being removed from their cases 180), the systems and methods described herein advantageously facilitate the binning and picking of such items 190 at the retail sales facility 110.

In some embodiments, based on the above-discussed inventory management factors or variables, a governing restriction with respect to the number of SKUs in a storage bin (and whether the item 190 is to be stocked in storage bins based on case pack level or each level) can be weighted by the influence each such inventory management factor or variable has on storage bin accuracy, productivity and on shelf availability. An exemplary equation based on which the processor of the control circuit 210 may be programmed to estimate whether the item 190 is to be binned as a case pick item (i.e., without being removed from the product case 180) or as an each pick item (i.e., after being removed from the product case 180) may be as follows:

$$B=f(CP,SC)+f(S)+f(Sz)+f(OH)$$

$$B_{max}=B*(B_{Phymax}) \quad \text{Equation 1:}$$

The $B_{phymax}$ in the equation above represents the physical maximum of the storage bin (or shelf, or another location where the items 190 are stored in the stock room 170). In the exemplary Equation 1 shown above, the inventory management factors being analyzed determine the maximum number of the analyzed item 190 allowed in that storage bin or storage location, and therefore determine the maximum number of unique SKUs allowed in the storage bin or storage location. In some embodiments, as a result of the calculation based on Equation 1 performed by the processor of the control circuit 210 of the inventory management electronic device 120, the processor of the control circuit 210 of the inventory management electronic device 120 is programmed to cause the inventory management electronic device 120 to indicate (e.g., via the display 260 or the speaker 280) to the stocking associate whether to store the item 190 in the stock room 170 as a case item or an each item.

Another exemplary equation that the processor of the control circuit 210 of the inventory management electronic device 120 may be programmed to calculate as a simplified alternative to the equation shown above may define the maximum number of unique SKUs allowed in a storage bin or other storage area of the stock room 170 and may be as follows:

$$B=f(CP,SC)+f(S)+f(Sz)+f(OH)$$

$$B_{max}=B*(B_{Skumax}) \quad \text{Equation 2:}$$

Notably, Equation 2 may create more situations (as compared to Equation 1) where the number of items 190 in a given storage bin or other storage space of the stock room 170 is not maximized. In some embodiments, each of the inventory management factors may be weighted by its influence to binning/picking accuracy and stocking associate productivity, as shown by another exemplary equation below that the processor of the control circuit 210 of the inventory management electronic device 120 may be programmed to calculate:

$$B = x \cdot f(CP,SC) + y \cdot f(S) + z \cdot f(Sz) + q \cdot f(OH) \therefore 1 = x+y+z+q \quad \text{Equation 3:}$$

In the above equations, the variables representing the exemplary inventory management factors described above are as follows:

B=Bin Quantity (raw) or the raw maximum number of items 190 allowed in the storage bin or another location (or locations) of the stock room 170;

CP=Case Pack or the number of items 190 (eaches) shipped to the retail sales facility 110 in a single case 180;

SC=Shelf Capacity or the maximum number of items 190 (eaches) that can fit onto a shelf on the sales floor of the retail sales facility 110;

S=Sales or the rate of sale (sales velocity) for the item 190. In other words, this variable and inventory management factor represents how may items 190 and/or case packs 180 of the items 190 on average does the retail sales facility 110 sell in a single day and/or single week and/or single month. It will be appreciated that instead of relying on historical data based on past actual sales of the items 190 and/or cases 180 at the retail sales facility 110, in some embodiments, a forecasting algorithm may be implemented to accurately determine forecasted sales of the items 190 and/or cases 180 for the next day and/or next week and/or next month;

Sz=Size or how physically big the item 190 is, or how big the case 180 is in terms of height, width, depth, and/or cubic volume (which can be calculated based on height, width, and depth);

OH=On-hand or how many total items 190 (and therefore cases 180 (if the amount of items 190 in a single case 180 is known) are present at the retail sales facility 110;

Bmax=Bin Max or the maximum number of items 190 or cases 180 allowed into a storage bin in the stock room 170 based on the totals of the applicable equation;

Bphymax=Bin Physical Max or the physical maximum number of items 180 and/or cases 180 allowed into the storage bin, in view of the physical limitations of the storage bin (i.e., height, width, depth) with respect to how many items 190 and/or cases 180 the storage bin can hold;

Bskumax=Bin SKU Max or the maximum number of unique SKUs or unique items that can be allowed into one storage bin or other location of the stock room 170;

X, Y, Z, Q=various factors—represent a percentage of influence each of the above-discussed inventory management factors have on the accuracy of a storage bin, and when added together, equal 1 (or 100%).

In some exemplary situations discussed by way of example only, the inventory management factors used in the above-described equations or formulas may be as follows: an increase in sales velocity (S) would reduce the variable percentage of the case 180 an item 190 would pick at, but would increase the restriction of number of unique SKUs (Bskumax) that could be binned in the same location. An increase in the number of SKUs (Bskumax) would increase the number of items 190 allowed (Bmax), while a reduction in the number of SKUs (Bskumax) would cause a corresponding reduction in the number of items 190 allowed (Bmax) in a storage bin. An increase in shelf capacity (SC) leads to an increase in the variable percentage of items 190 from a case 180. The shelf capacity can impact the restriction on the number of SKUs allowed into a storage bin due to case pack (CP) and shelf holding capacity (SC) having a relationship to the number by quantity of eaches and the likelihood of eaches.

Current inventory (OH) (when high) can affect the quantity of items 190 that may be binned by way of increasing the restriction of unique SKUs. In other words, items 190 with high inventory levels can be managed easier if such items 190 are located in the same location (i.e., one storage bin or one storage area in the stock room 170). The size (Sz) of an item 190 may impact the restriction on the number of items 190 allowed in a storage bin because the storage bins have a finite amount of physical storage space. The size of an item 190 may also impact the variable percentage of the case pick because the size of the item 190 impacts shelf holding capacity.

In the embodiment shown in FIG. 3, when the estimation by the processor of the control circuit 210 of the inventory management electronic device 120 in view of the inventory management factors described above supports storing and/or picking and/or managing the item 190 to be stocked in the stock room 170 while packed in the product case 180, the processor of the control circuit 210 of the inventory management electronic device 120 is programmed to output a visual alert (e.g., via a message on the display 260) or an audible alert (e.g., a beep or voice comment via the speaker 280) to the worker that the item 190 is to be stocked and/or picked from the storage bin without being removed from the product case (i.e., will be stocked and managed on the "case" level) (step 340). Conversely, when the estimation by the processor of the control circuit 210 of the inventory management electronic device 120 in view of the inventory management factors described above supports storing and/or picking and/or managing the item 190 to be stocked in the stock room 170 after being removed from the product case 180, the processor of the control circuit 210 of the inventory management electronic device 120 is programmed to output a visual alert (e.g., via a message on the display 260) or an audible alert (e.g., a beep or voice comment via the speaker 280) to the worker that the item 190 is to be stocked and/or picked from the storage bin after being removed from the product case (i.e., will be stocked and managed on the "each" level) (step 350).

In one embodiment, when the inventory management electronic device 120 indicates (e.g., via a visual or audible alert), based on estimation by the processor of the control circuit 210 of the inventory management electronic device, that the item 190 may be stocked in the storage bin without being removed from the case 180 or after being removed from the case 180, the inventory management electronic device 120 presents the associate with an option to acknowledge the alert, for example, by pressing on the display screen 260 or on one of the inputs 270 of the inventory management electronic device 120. In some embodiments, when the stocking associate makes an appropriate acknowledgment, the processor of the control circuit 210 of the inventory management electronic device 120 is programmed to systematically designate the item 190 as being managed on the case level or on the each level.

For example, the processor of the control circuit 210 may be programmed to send a signal to the inventory management database 140 or, via the input/output 240, to an inventory management database on a remote server, to indicate whether the item 190 is being systematically managed on the case level or on the each level. As such, the storage management level of the item 190 may be updated in the inventory management database 140 or a remote inventory management database for the retail sales facility 110, enabling the inventory management database 140 and/or a remote database to store updated information regarding the level based on which the items 190 are systematically managed during storage at the retail sales facility 110, thereby permitting the associates to efficiently retrieve such items 190 when necessary.

In some embodiments, if the stock room associate does not acknowledge the alert generated by the inventory management electronic device 120 and does not systematically indicate that the item 190 is being stored on the appropriate stocking level estimated by the inventory management electronic device 120, the processor of the control circuit 210 of the inventory management electronic device 120 is programmed to log the associate's lack of acknowledgment or failure to make an appropriate entry into the system indicating the storage level (i.e., case level or each level) for the item 190, thereby generating log data indicating that the stock room associate did not properly respond to the alert. Such logs may advantageously allow the inventory management system 100 to determine a metric for the quality of the work by the stocking associates. In some embodiments the inventory management system 100 may include a self-learning capability where, in response to a predetermined numbers of log events indicating that the stock room associate did not properly respond to the alert at the retail sales facility 110 (or at multiple retail sales facilities 110 in an area of interest), the inventory management system 100 may be configured such that the processor of the control circuit 210 is programmed to adjust the q factor in the above-described Equation 3 appropriately to factor in the occurrence of the predetermined number of such log events, thereby improving the accuracy of the system in estimating how the item 190 is to be stocked/managed at the retail sales facility 110.

It will appreciated that the estimation as to whether the items 190 are to be stocked in the storage bins at the retail sales facility 110 at the each level or at the case level as described above may be performed without requiring any calculation or analysis by the processor of the control circuit 210 of the inventory management electronic device 120, and that the system 100 may be configured such that this estimation may be performed by an inventory management computing device remote to the retail sales facility 110 and in communication with the inventory management electronic device 120. In such embodiments, the above-described estimation analysis of whether the items 190 are to be stocked in the storage bins at the retail sales facility 110 at the each level or at the case level may be performed by the inventory management computing device remote to the retail sales facility 110 (based on data stored in the inventory management database 140 or a remote inventory management database), and may be stored at the remote inventory management database or in the inventory management database 140 until a time when a user uses the inventory management electronic device 120 to scan an item 190 to be stocked in a storage bin at the retail sales facility 110, thereby activating the above-described methods and systems of determining whether the item 190 is to be stocked in the storage bins at the retail sales facility 110 at the each level or at the case level.

The systems and methods described herein provide for easy and efficient management and storage of overstock inventory at a retail sales facility. As discussed above, the systems and methods described herein advantageously estimate whether an item to be stored in the storage bin of the stock room at the retail sales facility is better suited for being stocked in the storage bin and systematically managed at the each level, or at the case level, and require the stocking associate to either keep the item to be stocked in the storage bin while still packed in the case if appropriate, or to remove the item from the case and stock the item in the storage bin after being removed from the case, if appropriate. This advantageously improves the efficiency of overstock inventory management at the retail sales facility and improves both the storage efficiency of items in the storage bins and the efficiency of the stocking associates in retrieving the items of interest from the stock room when necessary.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of sorting overstock items at a retail sales facility, the method comprising:
    receiving data, via a worker of the retail sales facility scanning a product case containing at least one product using an inventory management electronic device including a processor;
    obtaining, using the inventory management electronic device, at least one inventory management factor associated with the at least one product;
    estimating, based on the at least one inventory management factor associated with the at least one product and including a total number of the at least one product in the product case, a maximum number of the at least one product that can fit onto a shelf on a sales floor of the retail sales facility, a sales velocity of the at least one product at the retail sales facility, a size of the at least one product, and a total number of the at least one product on hand at the retail sales facility, whether the at least one product is to be picked by the worker from a storage bin at a stock room location of the retail sales facility while packed in the product case or after being removed from the product case;
    outputting, when the estimating step supports picking the at least one product from the storage bin while packed in the product case, an indication to the worker that the at least one product is to be picked from the storage bin without being removed from the product case; and
    outputting, when the estimating step supports picking the at least one product in the storage bin after being removed from the product case, an indication to the worker that the at least one product is to be picked from the storage bin after being removed from product case.

2. The method of claim 1, wherein the receiving step includes receiving identifying information for the at least one product in the product case in an inventory management database in response to the scanning of the product case by the worker at the retail sales facility, and wherein the obtaining step further comprises retrieving the at least one inventory management factor associated with the at least one product from the inventory management database.

3. The method of claim 1, wherein the at least one inventory management factor associated with the at least one product is at least one of: a total number of the at least one product in the product case, a maximum number of the at least one product for which shelf space is available on a sales floor of the retail sales facility, sales velocity of the at least one product at the retail sales facility, size of the at least one product, and a total number of the at least one product on hand at the retail sales facility.

4. The method of claim 1, further comprising outputting, when the estimating step supports storing the at least one product in the storage bin without being removed from the product case, an indication to the worker that the product case is to be binned in the storage bin such that only items having an identical stock keeping unit (SKU) to the at least one product in the product case are located in the storage bin.

5. The method of claim 1, further comprising outputting, when the estimating step supports storing the at least one product in the storage bin without being removed from the product case, an indication to the worker that the at least one product is to be picked from the product case at a predetermined pick percentage of the product case.

6. The method of claim 5, further comprising increasing the predetermined pick percentage of the at least one product from the product case in response to at least one of the following factors:
   a total number of the at least one product in the product case;
   a maximum number of the at least one product that can fit onto a shelf on a sales floor of the retail sales facility,
   a sales velocity of the at least one product at the retail sales facility,
   a size of the at least one product, and
   a total number of the at least one product on hand at the retail sales facility.

7. The method of claim 1, further comprising outputting, when the estimating step supports picking the at least one product from the storage bin after being removed from the product case, an indication to the worker that the at least one product is permitted to be binned in a storage bin having at least one other product having a stock keeping unit (SKU) different from the at least one product.

8. The method of claim 7, further comprising outputting, when the estimating step supports picking the at least one product from the storage bin after being removed from the product case, an indication to the worker of a maximum number of unique stock keeping units (SKUs) that are permitted to be stored in the storage bin.

9. A system for sorting overstock items at a retail sales facility, the system comprising:
   at least one inventory management database including information regarding at least one product at the retail sales facility;
   an inventory management electronic device including a control circuit having a processor in communication with the database and configured to:
   receive data, via a worker of the retail sales facility scanning a product case containing at least one product using the inventory management electronic device;
   obtain at least one inventory management factor associated with the at least one product;
   estimate, based on the obtained at least one inventory management factor associated with the at least one product and including a total number of the at least one product in the product case, a maximum number of the at least one product that can fit onto a shelf on a sales floor of the retail sales facility, a sales velocity of the at least one product at the retail sales facility, a size of the at least one product, and a total number of the at least one product on hand at the retail sales facility, whether the at least one product is to be picked by the worker from a storage bin at a stock room location of the retail sales facility while packed in the product case or after being removed from the product case;
   output, when the estimate supports picking the at least one product from the storage bin while packed in the product case, an indication to the worker that the at least one product is to be picked from the storage bin without being removed from the product case; and
   output, when the estimate supports picking the at least one product in the storage bin after being removed from the product case, an indication to the worker that the at least one product is to be picked from the storage bin after being removed from product case.

10. The system of claim 9, wherein the inventory management database is configured to receive identifying information for the at least one product in the product case in response to the worker at the retail sales facility scanning the product case, and wherein the control unit is configured to retrieve the at least one inventory management factor associated with the at least one product from the inventory management database.

11. The system of claim 9, wherein the at least one inventory management factor associated with the at least one product is at least one of: a total number of the at least one product in the product case, a maximum number of the at least one product for which shelf space on a sales floor is available at the retail sales facility, sales velocity of the at least one product at the retail sales facility, size of the at least one product, and a total number of the at least one product on hand at the retail sales facility.

12. The system of claim 9, wherein the processor is programmed to output, when the estimation supports picking the at least one product from the storage bin without being removed from the product case, an indication to the worker that the single case is to be binned in the storage bin such that only items having an identical stock keeping unit (SKU) to the at least one product in the product case are located in the storage bin.

13. The system of claim 9, wherein the processor is programmed to output, when the estimation supports picking the at least one product in the storage bin without being removed from the product case, an indication to the worker that the at least one product is to be picked from the product case at a predetermined pick percentage of the product case.

14. The system of claim 13, wherein the processor is programmed to increase the predetermined pick percentage of the at least one product from the product case in response to at least one of the following factors:
   a total number of the at least one product in the product case;
   a maximum number of the at least one product that can fit onto a shelf on a sales floor of the retail sales facility,
   a sales velocity of the at least one product at the retail sales facility,
   a size of the at least one product, and
   a total number of the at least one product on hand at the retail sales facility.

15. The system of claim 9, wherein the processor is programmed to output, when the estimation supports picking the at least one product from the storage bin after being removed from the product case, an indication to the worker that the at least one product is permitted to be binned in a storage bin having at least one other product having a stock keeping unit (SKU) different from the at least one product.

16. The system of claim 15, wherein the processor is programmed to output, when the estimation supports picking the at least one product from the storage bin after being removed from the product case, an indication to the worker of a maximum number of unique stock keeping units (SKUs) that are permitted to be stored in the storage bin.

17. A system for sorting overstock items at a retail sales facility, the system comprising: at least one storage means including information regarding at least one product at the retail sales facility;

at least one control means in communication with the database and configured to:

receive data, via a worker of the retail sales facility scanning a product case containing at least one product using the inventory management electronic device;

obtain at least one inventory management factor associated with the at least one product;

estimate, based on the obtained at least one inventory management factor associated with the at least one product and including a total number of the at least one product in the product case, a maximum number of the at least one product that can fit onto a shelf on a sales floor of the retail sales facility, a sales velocity of the at least one product at the retail sales facility, a size of the at least one product, and a total number of the at least one product on hand at the retail sales facility, whether the at least one product is to be picked by the worker from a storage bin at a stock room location of the retail sales facility while packed in the product case or after being removed from the product case;

output, when the estimate supports picking the at least one product from the storage bin while packed in the product case, an indication to the worker that the at least one product is to be picked from the storage bin without being removed from the product case; and output, when the estimate supports picking the at least one product in the storage bin after being removed from the product case, an indication to the worker that the at least one product is to be picked from the storage bin after being removed from product case.

* * * * *